(12) United States Patent
Lin

(10) Patent No.: US 6,643,299 B1
(45) Date of Patent: Nov. 4, 2003

(54) BI-METAL AND OTHER PASSIVE THERMAL COMPENSATORS FOR FIBER-BASED DEVICES

(75) Inventor: Hong Tony Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 0 days.

(21) Appl. No.: 10/037,298

(22) Filed: Dec. 31, 2001

Related U.S. Application Data

(63) Continuation-in-part of application No. 09/908,438, filed on Jul. 17, 2001.
(60) Provisional application No. 60/259,015, filed on Dec. 29, 2000, provisional application No. 60/245,869, filed on Nov. 3, 2000, and provisional application No. 60/218,632, filed on Jul. 17, 2000.

(51) Int. Cl.[7] .............................................. H01S 3/30
(52) U.S. Cl. ................................ 372/6; 372/94; 372/18
(58) Field of Search ................................ 372/6, 94, 18

(56) References Cited

U.S. PATENT DOCUMENTS

| | | | | |
|---|---|---|---|---|
| 4,703,287 A | * | 10/1987 | Fournier et al. | 359/279 |
| 5,052,632 A | * | 10/1991 | Stokes, Jr. | 242/476.7 |
| 5,053,693 A | * | 10/1991 | Bohnert et al. | 324/96 |
| 5,270,869 A | * | 12/1993 | O'Brien et al. | 359/820 |
| 5,457,532 A | * | 10/1995 | August et al. | 356/460 |
| 5,488,475 A | * | 1/1996 | Friebele et al. | 356/478 |
| 5,574,739 A | * | 11/1996 | Carruthers et al. | 372/27 |
| 5,637,865 A | * | 6/1997 | Bullat et al. | 250/227.14 |
| 2002/0071453 A1 | * | 6/2002 | Lin | 372/6 |

OTHER PUBLICATIONS

M. Nakazawa and H. Kubota and K. Tamura, IEEE Photon. Technol. Lett. 8, 452 (1996).
N.J. Smith, N.J. Doran, F.M. Knox and W. Forysiak, Opt. Lett. 21, 1981 (1996).
M. Nakazawa, H. Kubota, A. Sahara and K. Tamura, IEEE Photon. Technol. Lett. 8, 1088 (1996).
N. J. Smith, F.M. Knox, N.J. Doran, K.J. Blow and I. Bennion, Electron. Lett. 32, 54 (1996.
N.S. Bergano, C.R. Davidson, C.J Chen, B. Pedersen, M.A. Mills, N. Ramanujam, H.D. Kidorf, A.B. Puc, M.D. Levonas and H. Abdelkader, OFC 99 postdealine papers, PD2.
D.L. Weidman, et al. "A novel negative expansion substrate material for athermalizing fiber bragg gratings" 22nd European Conference on Optical Communications, 1996, p 1.61–1.64, MoB 3.5.

* cited by examiner

Primary Examiner—Paul Ip
Assistant Examiner—Dung T Nguyen
(74) Attorney, Agent, or Firm—Fish & Richardson P.C.

(57) ABSTRACT

Bi-metal and other passive thermal compensators for mitigating thermal-induced variations in the length of a fiber loop. Exemplary applications in fiber lasers are described.

16 Claims, 9 Drawing Sheets

BI-METAL AND OTHER PASSIVE THERMAL COMPENSATORS FOR FIBER-BASED DEVICES

This application claims the benefit of U.S. Provisional Application No. 60/259,015 entitled "Actively Mode-Locked Fiber Laser with Bi-Metal Temperature Compensator" and filed Dec. 29, 2000. This application is also a continuation-in-part application of U.S. Application Ser. No. 09/908,438 entitled "Active and Low-Power Laser Stabilization" filed Jul. 17, 2001 which claims the benefits of U.S. Provisional Application Nos. 60/218,632 entitled "Highly Stable Actively Mode-Locked Fiber Laser" filed on Jul. 17, 2000, and 60/245,869 entitled "Actively Mode-Locked Fiber Laser with Active Cavity Control with Low Power Consumption" and filed on Nov. 3, 2000.

BACKGROUND

This application relates to passive temperature compensators, and more specifically, to passive temperature compensators used in fiber-based devices and systems.

Various materials change their physical dimensions with a change in temperature. In many devices and systems, such temperature dependency is undesirable because it may adversely alter the characteristics or performance of a device. For example, this temperature dependency of an optical path in an optical device may change the associated optical path length and hence introduce a temperature-dependent phase shift in an optical signal propagating along the path. This phase shift can degrade the performance or even interrupt the normal operations of the device.

Examples of optical devices and systems that are sensitive to such temperature dependency include, among others, devices based on optical interference. Optical resonators or cavities, for example, are sensitive to a change in the optical path length. A laser's main component is its optical cavity that encloses a laser gain medium. The simplest-optical cavity includes two reflectors to reflect light between them. The laser cavity provides an optical feedback mechanism to bounce light back and forth multiple times through the laser gain medium for optical amplification. The laser cavity also selects one or more proper lasing frequencies within the gain spectral profile of the laser gain medium by requiring each selected frequency of light to be in resonance with the laser cavity. Furthermore, the laser cavity operates to confine the light rays of the laser approximately along the optic axis of the laser cavity by filtering out light rays in other directions. As a result, the geometry of the laser cavity affects various characteristics of the laser.

The geometry of the laser cavity, however, may change with respect to many factors, such as environmental conditions (e.g., temperature or vibrations) and its own aging process. One notorious factor is a change in the cavity length due to the thermal expansion. Since a change in the laser cavity is time dependent, it is therefore desirable to provide an active control mechanism to stabilize the laser cavity by dynamically adjusting the optical path length of the cavity to mitigate variation in the optical path length of cavity caused by temperature, vibration, or aging of the cavity.

SUMMARY

A device according to one embodiment includes an inner hollow cylindrical member and an outer hollow cylindrical member engaged to each other as a passive thermal compensator. The inner hollow cylindrical member is formed of a first material with a first coefficient of thermal expansion and has a gap along a cylindrical axis to split the inner hollow cylindrical member. The outer hollow cylindrical member is formed of a second material with a second coefficient of thermal expansion greater than the first coefficient of thermal expansion and havs a gap along a cylindrical axis to split the outer hollow cylindrical member. The inner hollow cylindrical member is situated within the outer hollow cylindrical member and has an outer surface conformingly engaged to an inner surface of the outer hollow cylindrical member. A fiber loop may be wound around the outer hollow cylindrical member so as to reduce a thermal variation in the fiber length.

DETAILED DESCRIPTION

An optical fiber is usually subject to thermal expansion when the environmental temperature changes. One way to mitigate such change in the fiber length due to temperature variation is to place the fiber in a temperature-controlled enclosure to maintain the fiber at a substantially constant temperature. Such temperature-controlled enclosure may be implemented with a heating mechanism or a combination of heating and cooling mechanism to maintain the temperature of the fiber. Alternatively, a fiber stretching actuator, e.g., a piezo-electric transducer, may be engaged to the fiber to actively adjust the fiber length to eliminate or substantially reduce the change caused by the variation in temperature. Both of these techniques require an active feedback control mechanism to effectuate the control. Such control mechanism consumes electrical power and adds burden on the overall power budget of the fiber system.

This application teaches techniques and fiber system designs that use passive thermal compensation to mitigate the change in the fiber length due to the temperature variation. Such passive thermal compensation does not consume power and hence can reduce the overall power consumption of the fiber system. In addition, the passive thermal compensation may be combined with an active thermal compensation mechanism such as the fiber stretching actuator or an active fiber temperature control mechanism to mitigate the thermal variation in the fiber. Such combination can reduce the operating range of the fiber stretching actuator or the amount of fiber under the thermal control of the temperature control mechanism. Therefore, the overall power consumption of the system can be reduced accordingly.

Figure 1:
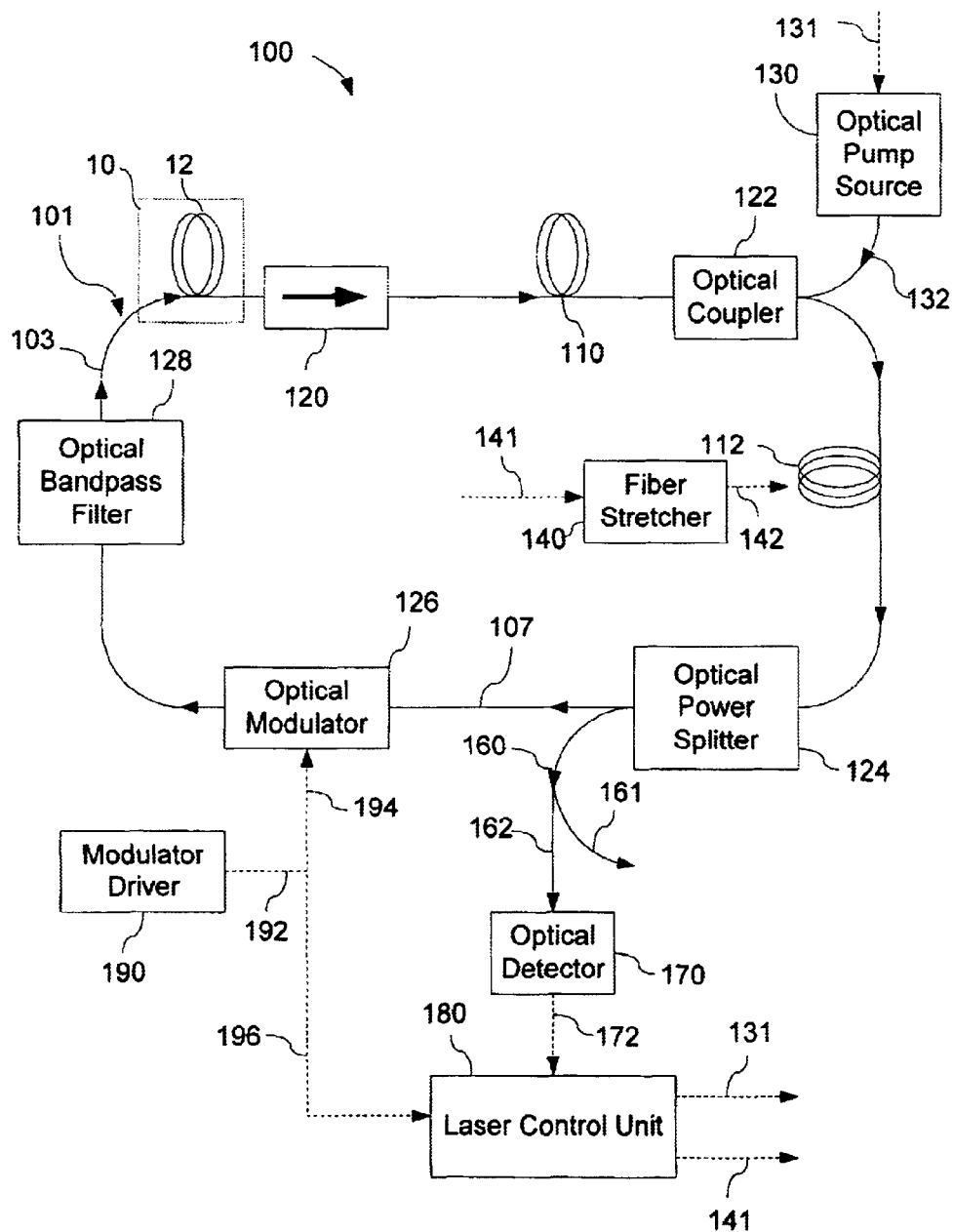
FIGS. 1 and 2 shows embodiments of an actively mode-locked fiber lasers with a bi-metal passive thermal compensator shown in FIGS. 1A and 1B.
Figure 1A:
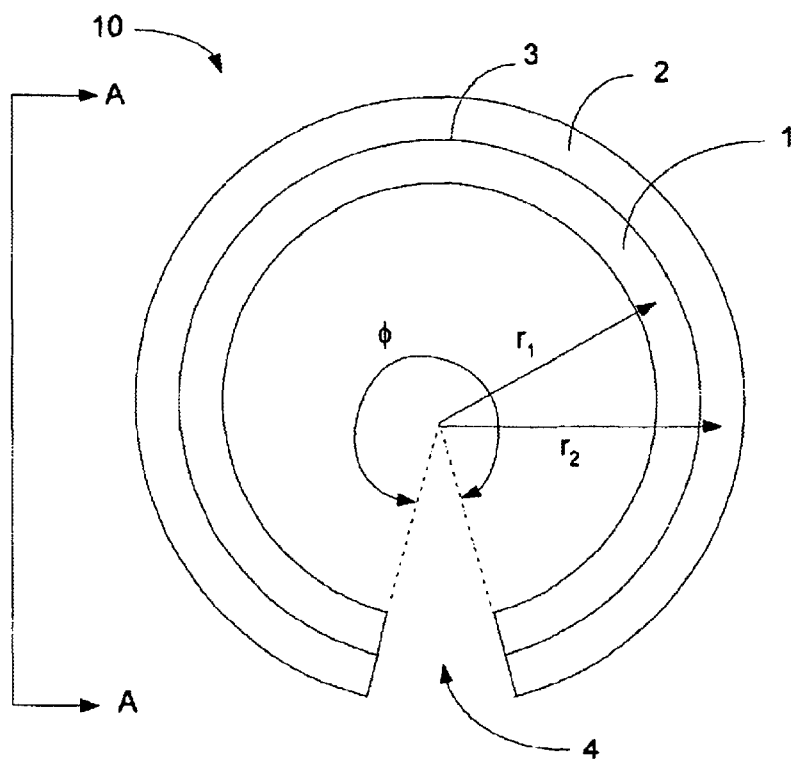
FIGS. 1A and 1B show one embodiment of a bi-metal passive thermal compensator for reducing a change in a fiber loop caused by temperature.

FIG. 1A shows a cross sectional view of one embodiment of a bi-metal passive thermal compensator 10 for reducing a change in a fiber loop caused by temperature. The compensator 10 includes an inner cylindrical member 1 formed of a first material with a first coefficient of thermal expansion ($K_1$) and an outer cylindrical member 2 formed of a second material with a second coefficient of thermal expansion ($K_2$) greater than $K_1$. Both cylindrical members are hollow. The inner cylindrical member 1 is located within the outer cylindrical member 2 in a substantially concentric position. In addition, the outer diameter of the inner cylindrical member 1 is substantially equal to or close to the inner diameter of the outer cylindrical member 2. Thus, the outer surface of the inner cylindrical member 1 substantially conforms to and is fixed to the inner surface of the outer cylindrical member 2 to form an interface 3 by bonding. Furthermore, both cylindrical members 1 and 2 are not fully enclosed by the side walls but have a gap 4 on the side wall which is along the cylindrical axis to split the hollow cylinder. This gap allows for a circumferential change in dimension in each cylindrical member. The gaps in both cylindrical members 1 and 2 are shown to overlap with each other in the illustrated embodiment. Alternatively, the gaps may not overlap and are located at different angular positions.

Under the above geometry and construction, the outer surface of the inner cylindrical member 1 the inner surface of the outer cylindrical member 2 do not move relative to each other but instead expand or contract together as the temperature changes. As explained below, the outer diameter of the outer cylindrical member 2 of this compensator 10 exhibits a negative coefficient of thermal expansion, i.e., the outer diameter increases as the temperature decreases, and conversely the outer diameter decreases as the temperature increases. Since fibers have positive coefficients of thermal expansion, the thermal variation in a fiber loop that is wound around the compensator 10 under tension can be reduced or even eliminated by the negative thermal effect of the compensator 10. The dimensions of the cylindrical members 1 and 2 such as the their thickness values, their diameter values, and the gap widths, and the coefficients $K_1$ and $K_2$ may be selected so that the negative thermal effect can be substantially equal to or close to the positive thermal effect of the fiber loop.

As an example, assume that both cylindrical members 1 and 2 have the same thickness t but different mean radii $r_1$ and $r_2$, respectively. It is further assumed that the gaps in both cylindrical members 1 and 2 extend the same arc angle of $\phi$ and thus the same gap width. Therefore, the arc lengths of the cylindrical members 1 and 2 are $l_1 = r_1 \cdot \phi$, and $l_2 = r_2 \cdot \phi$, respectively. The mean radius $r_1$ of the inner cylindrical member 1 can be expressed as $$r_1 = \frac{t}{\frac{l_1}{l_2} - 1}, \tag{1}$$

Accordingly, $$\frac{\delta r_1}{r_1} = \frac{\delta t}{t} - \frac{r_1}{t}\left(\frac{l_2}{l_1}\right)\left(\frac{\delta l_2}{l_2} - \frac{\delta l_1}{l_1}\right) = \frac{\delta t}{t} - \frac{r_1}{t}\left(\frac{l_2}{l_1}\right)(K_2 - K_1)\delta T, \tag{2}$$

where $\delta l_1 = K_1 l_1 \delta T$, $\delta l_2 = K_2 l_2 \delta T$, and $\delta T$ is the change in temperature. Hence, when $\delta t/t$ is much smaller than other terms, the Equation (2) can be approximately written as $$\frac{\delta r_1}{r_1} \approx -\frac{r_1}{t}\left(\frac{l_2}{l_1}\right)(K_2 - K_1)\delta T. \tag{3}$$

Because $K_2 > K_1$, Equation (3) indicates a negative thermal effect. The dimension parameters, $r_1$, $l_1$, and $l_2$ and the coefficients $K_1$ and $K_2$ may be selected to achieve a desired amount of $\delta r_1/r_1$ to negate the thermal expansion or contraction of a given fiber loop on the compensator 10. The assumption of that $\delta t/t$ is much smaller than other terms in Equation (2) is a weak assumption and is applicable in most designs where the arc lengths of the cylindrical members are much greater than their respective thickness values.

The cylindrical members 1 and 2 may be formed of different metallic materials. For example, the inner cylindrical member 1 may be formed of steel such as the commercial material AISI C1020 with $K_1 = 1.13 \times 10^{-5}$ per degree, $r_1 = 25$ mm, and $t = 2.5$ mm; the outer cylindrical member 2 may be formed of aluminum such as a commercial material 7079-T6 with $K_2 = 2.47 \times 10^{-5}$ per degree. In this case, $\delta r_1/r_1$ is $-1.34 \times 10^{-5}$ per degree. The bonding between the outer surface of the inner cylindrical member 1 and the inner surface of the outer cylindrical member 2 may be achieved by indirectly bonding with an adhesive layer applied between the surfaces. Suitable glues and epoxy may be used. Alternatively, the bonding may be achieved by directly bonding without an adhesive layer. For example, when the materials for the cylindrical members 1 and 2 are properly selected, the outer surface of the inner cylindrical member 1 and the inner surface of the outer cylindrical member 2 may be directly bonded by a bonding layer formed through a diffusion process when the surfaces are pressed against each other under pressure.

Figure 1B:
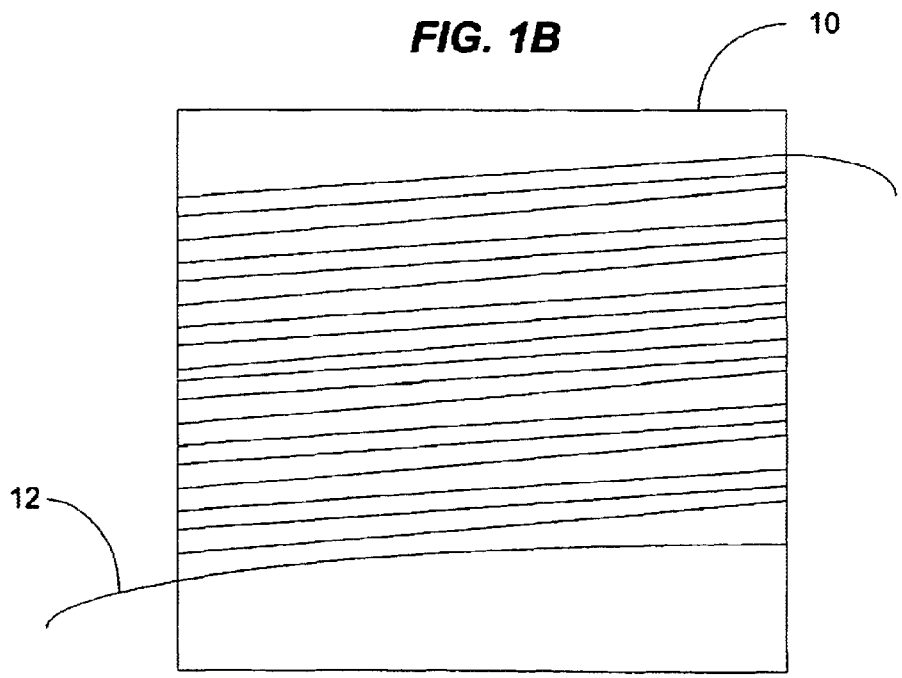

FIG. 1B shows a side view of the compensator 10 along the lines AA shown in FIG. 1A. In operation, a fiber loop 12 is wound on the outer cylindrical member 2 of the compensator 10 with an appropriate amount of tension such that the amount of the stretching in the fiber loop 12 increases as the compensator 10 expands with a decrease in temperature and decreases as the compensator 10 contracts with an increase in temperature.

The above passive thermal compensator 10 may be used in various fiber devices and systems where thermal expansion and contraction of fiber need be compensated. The following describe mode-locked fiber lasers incorporating the passive thermal compensator 10 as examples. In general, the laser resonator is formed of one or more fiber segments. The laser resonator may be divided into a passively controlled resonator section where the passive thermal compensator is used to mitigate the thermal variation, and an actively controlled resonator section where an active control mechanism is implemented to mitigate the thermal variation beyond the compensation range of the passively controlled resonator section and other effects that affect the optical length of the laser resonator. The active control mechanism may be further partitioned into a slow active control sector for compensating slow thermal effects and a fast active control sector for compensating fast processes such as vibrations or certain processes in the gain medium.

FIG. 1 shows one embodiment of an actively mode-locked fiber laser 100 that uses fiber segments 110, 112, 103, 105, and 107 to form a closed fiber ring or loop 101. This fiber ring 101 constitutes the laser cavity or resonator. Polarization-maintaining single-mode ("PM") fibers or polarizing single-mode fibers may be used in the fiber ring 101 to make it polarization maintaining. A PM fiber is configured to have well-defined principal axes for two mutually orthogonal polarizations. A polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, "polarization-maintaining fiber" fiber will be used to include any fiber or optical waveguide that can preserve an optical polarization of a beam.

The fiber segment 110 is doped with active ions to produce the desired optical gain for the laser oscillation when optically pumped by light at a pump wavelength generally shorter than the lasing wavelength. When the optical gain in the segment 110 exceeds the total optical loss in the entire ring 101, laser oscillation can be generated. Many different dopants can be used to achieve laser oscillations at different wavelengths. For example, atomic transitions in rare-earth ions, such as erbium, holmium, neodymium, samarium, thulium and ytterbium, can be used to produce lasers from visible wavelengths to far infrared wavelengths (e.g., from 0.45 to about 3.5 microns). Er-doped fiber lasers for producing optical pulses at 1.55 micron are particularly useful for optical fiber communication since the optical loss in the commonly used silica fibers is minimum at about 1.55 micron under optical pumping at 980 nm or 1480 nm. Two or more different rare-earth ions can be mixed together to achieve certain pump and laser wavelengths that may not be readily available from a single doping element.

An optical pump source 130 (e.g., a laser) is provided to generate the desired pump light 132 at a proper pump wavelength. The pump source 130 may operate in response to an electrical driving signal 131 as in a diode-based pump source where the signal 131 is the driving current to the diode or diodes. An optical coupler 122 such as a fiber coupler is coupled in the fiber ring 101 adjacent to the fiber gain segment 110 to couple the pump light 132 into the gain segment 110. The optical coupler 122 is wavelength selective to couple only light at the pump wavelength and does not couple light at the laser wavelength. An optical bandpass filter 128 may be deployed in the fiber ring 101 to select only the desired laser wavelength to circulate in the fiber ring 101 by suppressing light at other wavelengths. An optical power splitter 124, e.g., a fiber coupler, may be used to split a portion of the laser power in the ring 101 to produce an output. Another optical coupler 160 is further used to split the output into a beam 161 as the output and a monitor beam 162 for monitoring the condition of the laser oscillation and the fiber ring 101 in one or more control feedback loops for stabilizing the laser. An optical isolator 120 is used in the fiber ring 101 to ensure a single-directional oscillation in the fiber ring 101 (e.g., the clockwise direction as shown).

A mode-locked laser generally produces multiple longitudinal modes that oscillate simultaneously. A mode-locking mechanism is implemented in the resonator to synchronize the phases of different modes in such a way that the phase difference between any two adjacent modes is a constant. These phase-locked modes constructively add to one another to produce a short pulse. In the laser 100, an optical modulator 126 is coupled in the fiber ring 101 to modulate the light in the fiber ring 101 under a control by a modulator control signal 194 at a modulation frequency. One exemplary implementation of such a modulator is an electro-optic modulator based on the electro-optic effect. A $LiNbO_3$ crystal or other electro-optic material may be used. A Mach-Zehnder configuration is often used in many commercial optical modulators. Alternatively, an acousto-optic modulator may also be used as the modulator 126.

A modulator driver 190, such as a RF signal generator or synthesizer, is used to produce the modulator control signal 194 to drive the optical modulator 126. The control signal 194 may be a RF signal at a desired frequency, e.g. tens of GHz, such as 10 GHz or 40 GHz.

The optical dispersion in the fiber ring 101 may be reduced to a desirable small amount by design, e.g., using low-dispersion optical materials. When the dispersion of the fiber ring 101 is unacceptable, a dispersion compensating fiber segment 112 may be included in the fiber ring 101 to produce an optical dispersion that negates the optical dispersion in the fiber ring 101 caused by other fibers and the fiber gain segment 110. This dispersion compensating fiber segment 112 may be configured to operate in two different modes. In the first mode, the fiber 112 is designed to reduce or minimize the overall dispersion in the fiber ring 101 and hence to shorten the pulse width. In the second mode, the fiber 112 is designed to provide a condition where the self-phase modulation and the group velocity dispersion are balanced to produce optical solitons rather than regular optical pulses.

Notably, the fiber segments 110 and 112 may be designed to constitute the majority of the optical path length of the fiber ring 101, e.g., greater than about 80%. Hence, any variations in the physical lengths of the fiber segments 110 and 112 dominate over variations in other fiber segments (less than 3 to 10%) in the fiber ring 101.

The laser 100 has an active control mechanism which includes a fiber stretcher 140 coupled to the fiber segment 112 to control its physical length and hence the overall optical path length of the fiber ring 101. The fiber stretcher 140 operates to apply a force 142 to change the length of the fiber segment 112 to provide the fast control for processes such as vibrations and certain processed in the doped fiber gain segment 110. A laser control unit 180 is coupled to produce a control signal 141 for controlling the operation of the fiber stretcher 140. The performance of the laser 100 is monitored by using an optical detector 170 to convert the optical signal 162 into an electronic signal 172. This optical-to-electronic interface provides a feedback for the fast length control over the fiber 112 by the fiber stretcher 140. The laser control unit 180 processes this monitor signal 172 to produce the fast control signal 141. An output signal 192 of the modulator driver 190 is split into the portion 194 for controlling the modulator 126 and a portion 196 for operating the laser control unit 180. As described in later sections of this application, the optical detector 170 and the laser control unit 180 can also produce a control signal for at least another active control loop.

In one implementation, a piezo-electric transducer may be used as the fiber stretcher. The fiber stretcher 140 is generally enclosed in the chamber 150. The fiber stretcher 140 may also be coupled to control the physical length of the gain fiber 110. Both fiber segments 110 and 112 may be actively controlled by fiber stretchers as the fast control mechanism.

Notably, the laser 100 also includes a passive thermal compensator 10 that passively control the length of a fiber loop segment 12 in response to a temperature change. The fiber loop segment 12 may be located anywhere in the fiber ring that is not controlled by the fiber stretcher 140. The compensator 10 operates passively without any power supply and operates independently from the control of the laser control unit 180.

Figure 2:
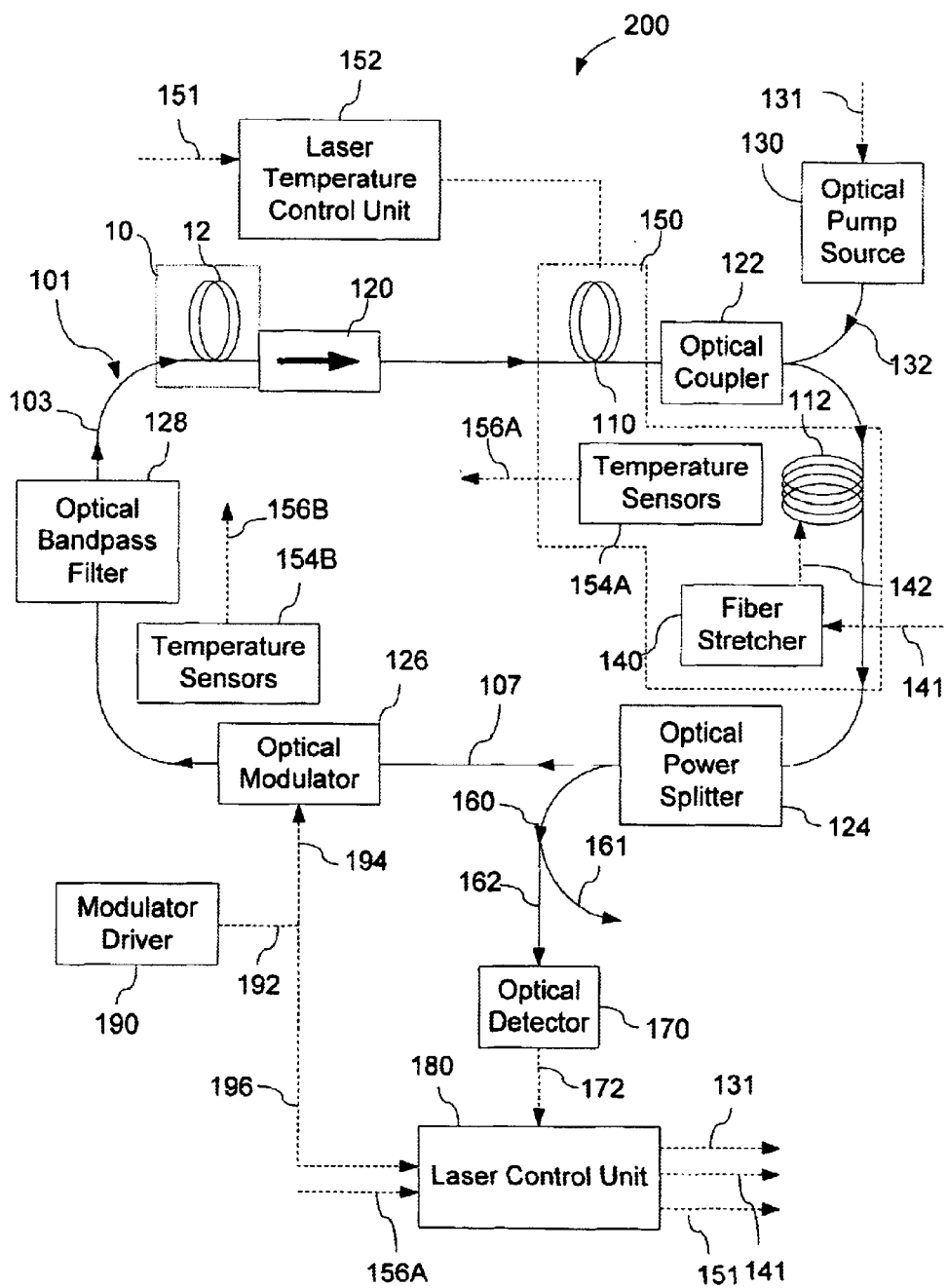

FIG. 2 shows another fiber laser 200 which modifies the laser 100 in FIG. 1 by adding another thermal active control chamber 150 to enclose only the fiber segments 110 and 112 while leaving other fiber segments and optical components outside the chamber 150. This use of active thermal control on only a part of the laser resonator is to reduce the power consumption in comparison to thermally stabilizing the entire fiber ring 101. A temperature control unit 152 is thermally coupled to the chamber 150 to actively control the temperature of the fiber segments 110 and 112 in response to a control signal 151 produced by the laser control unit 180 and the optical detector 170. One or more temperature sensors 154A are distributed in the chamber 150 to measure the temperature therein. In particular, locations of multiple temperature sensors 154A may be strategically selected within the chamber 150 to more accurately measure the average temperature of the enclosed fiber segments 110 and 112. The sensor signals 156A are then fed to a laser control unit 180 that generates the control signal 151 based on the signals 156A. This forms the active thermal control loop in the laser 100. Additional temperature sensors 150B may also be placed in other parts of the fiber ring 101 outside the thermally-controlled chamber 150. The sensor signals 156B indicating local temperatures at the sensor locations are also fed to the laser control unit 180.

Figure 2A:
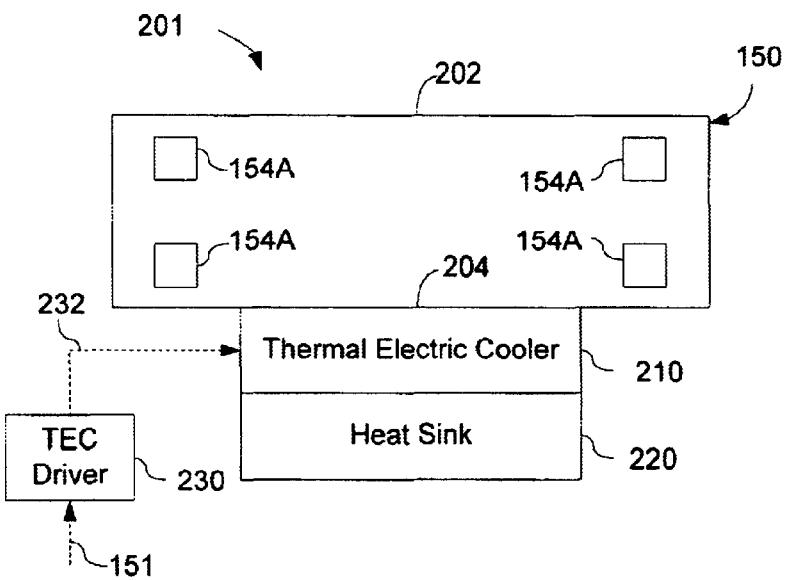
FIG. 2A show one embodiment of the thermally-controlled chamber in FIG. 2.

FIG. 2A shows one implementation 201 of the active thermal control of the fiber segments 110 and 112 in FIG. 2. A thermal electric cooler 210 is used as the temperature unit 152. The thermal electric cooler 210 has one side in thermal contact with a surface 204 of the chamber 150 and another side in thermal contact with a heat sink 220. A TEC driver 230 is electrically coupled between the laser control unit 180 and the TEC 210 to convert the control signal 151 into the driver signal 232 that generally is a driving current. The surface 204 of the chamber 150 may be formed of a material with a low heat resistance to promote thermal conductivity between the chamber 150 and the TEC 210. The other surfaces 202 of the chamber may be formed of a thermal insulating material to thermally isolate the chamber interior from the environment.

Figure 3:
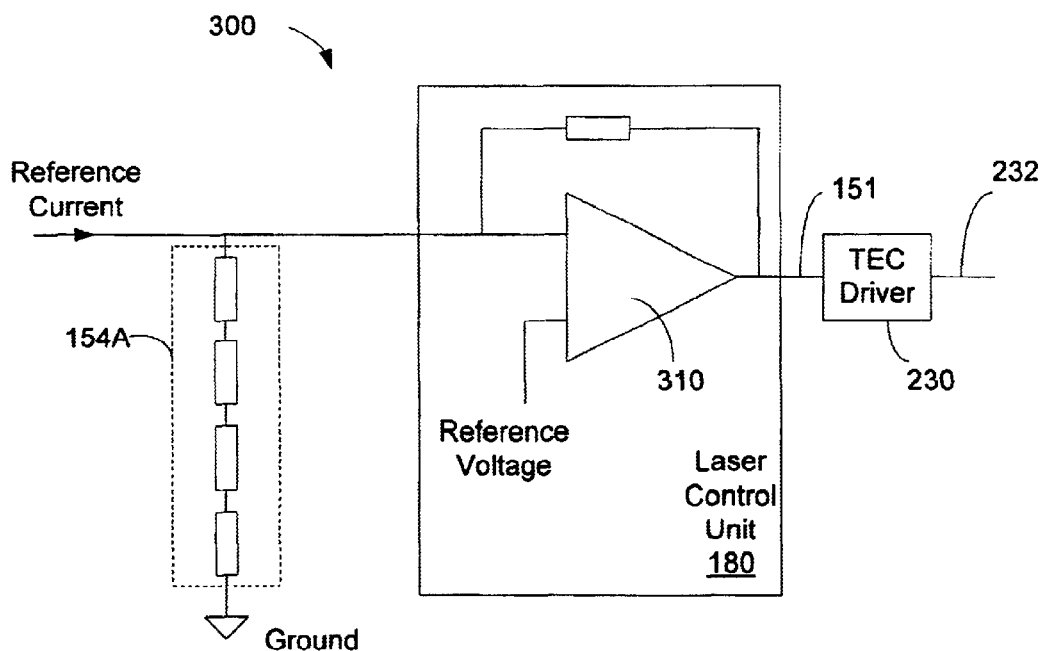
FIG. 3 shows an analog implementation of a laser control unit in FIG. 2 that produces a temperature control signal.

FIG. 3 shows one implementation 300 of a part of the laser control unit 180 that converts the sensor signals 156A into the control signal 151 when designed as an analog circuit. In this design, the temperature sensors 154A are assumed to be thermal resistors that are connected in series electrically. An inverted op-amp 310 is used to compare the signals 156A with a reference voltage. If the measured temperature of the chamber 150 is less than a desired temperature, the difference between the voltage drop across the thermal resistors 154A and the reference voltage produces a signal 151 that operates the TEC 210 to heat up the chamber 150. If the measured temperature is higher than the desired temperature, the TEC 210 reduces heating or operates in cooling mode to reduce the chamber temperature.

Figure 4:
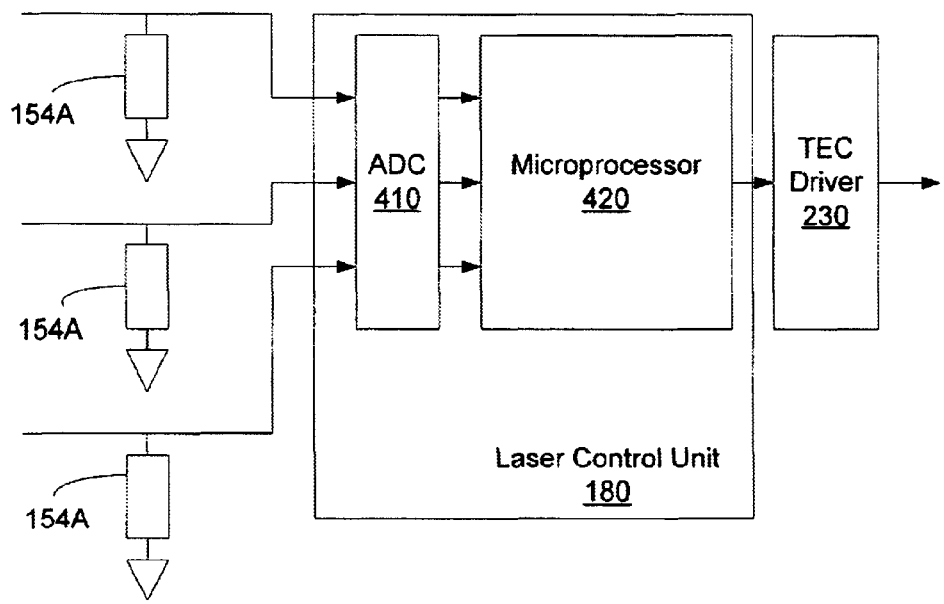
FIG. 4 shows a digital implementation of a laser control unit in FIG. 2 that produces a temperature control signal.

FIG. 4 shows a part of the laser control unit 180 that converts the sensor signals 156A into the control signal 151 when designed as a digital circuit. Signals 156A from different temperature sensors 154A are separated fed into the laser control unit 180. An analog-to-digital converter 410 is used to convert the analog sensor signals 156A into digital signals. A microprocessor 420 receives and process the digital sensor signals to control the TEC driver 230. This digital design based on the microprocessor 420 provides flexibility and convenience in signal processing that are difficult to implement in the analog design. For example, different signals 156A may be averaged with different weights according to the sensor locations in the chamber 150 to produce an averaged temperature of the enclosed portion of the fiber ring 101.

Figure 5A:
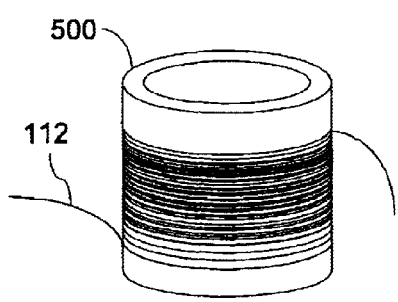
FIGS. 5A and 5B shows a PZT fiber stretcher and the technique for winding the fiber.
Figure 5B:
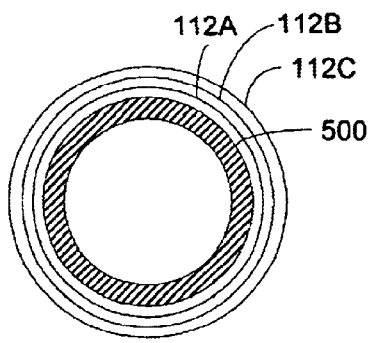

The fiber stretcher 140 in FIGS. 1 and 2 may be a piezo-electric tube 500 illustrated in FIGS. 5A and 5B. The fiber segment 112 may be wound around the exterior surface of the PZT 500, preferably without hard bending and twisting to reduce the optical loss. FIG. 5B shows the fiber segment 112 may be wound in layers (e.g., 112A, 112B, 112C, etc.) to increase the stretching sensitivity and the total amount of stretching. An adhesive, such as an epoxy, may be applied to the fiber coil. In one implementation, such PZT tube 500 may operate in the range of kilohertz range to compensate for changes caused by most acoustic vibrations.

Figure 6:
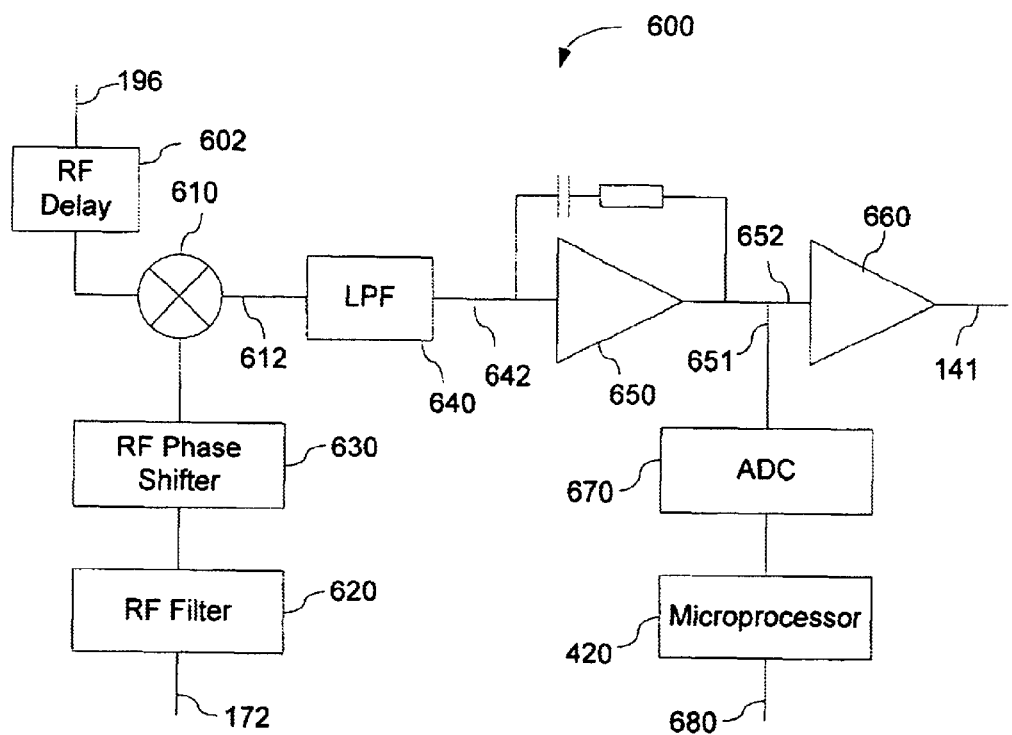
FIG. 6 shows an analog implementation of a part of the laser control unit that produces the control signal for the fiber stretcher.

FIG. 6 shows one implementation 600 of another part of the laser control unit 180 that produces the fast control signal 141 to the fiber stretcher 140. The output signal 192 of the modulator driver 190 is split into the portion 194 for controlling the modulator 126 and a portion 196 for operating the laser control unit 180. The laser control unit 180 processes this portion 196 and the monitor signal 172 from the optical detector 170 to produce the signal 141. This part of the laser control unit 180 a RF filter 620 and a RF phase shifter 630 process the monitor signal 172. An RF delay unit 602 may be optionally connected in the input path of the signal 196. A RF signal mixer 610 is then coupled to the delay unit 602 and the RF phase shifter 630 to mix the signals 196 and 172 and produces a new signal 612. A low-pass RF filter 640 then filters out the high-frequency components of the signal 612 to produce a signal 642 that includes the signal component at the difference frequency between the frequencies of the signals 172 and 196. The signal 642 can be used to indicate the phase relation between the modulation signal 192 and the optical pulses at the laser wavelength in the ring 101. An integrator 650 to produce two signals 651 and 652 with the same information. The signal 652 is amplified by a high-voltage amplifier 660 to produce the driver signal 141 for driving the PZT fiber stretcher 140 to synchronize the total optical path length of the fiber ring 101 with the modulation frequency of the optical modulator 126 so that a multiplicity of the longitudinal mode spacing set by the total optical path length of the fiber ring 101 is substantially equal to the modulation frequency of the signal 194.

This part of the laser control unit 180 also includes an analog-to-digital converter 670 and the microprocessor 420 to process the signal 651 to produce a control signal 680 for controlling the temperature,of the chamber 150. The control signal 680 is used to bias the temperature of the chamber 150 so that the total optical path length of the fiber ring 101 is set to a state where the fiber stretcher 140 can adjust the cavity length in both directions within the operating range of the fiber stretcher 140.

Figure 7:
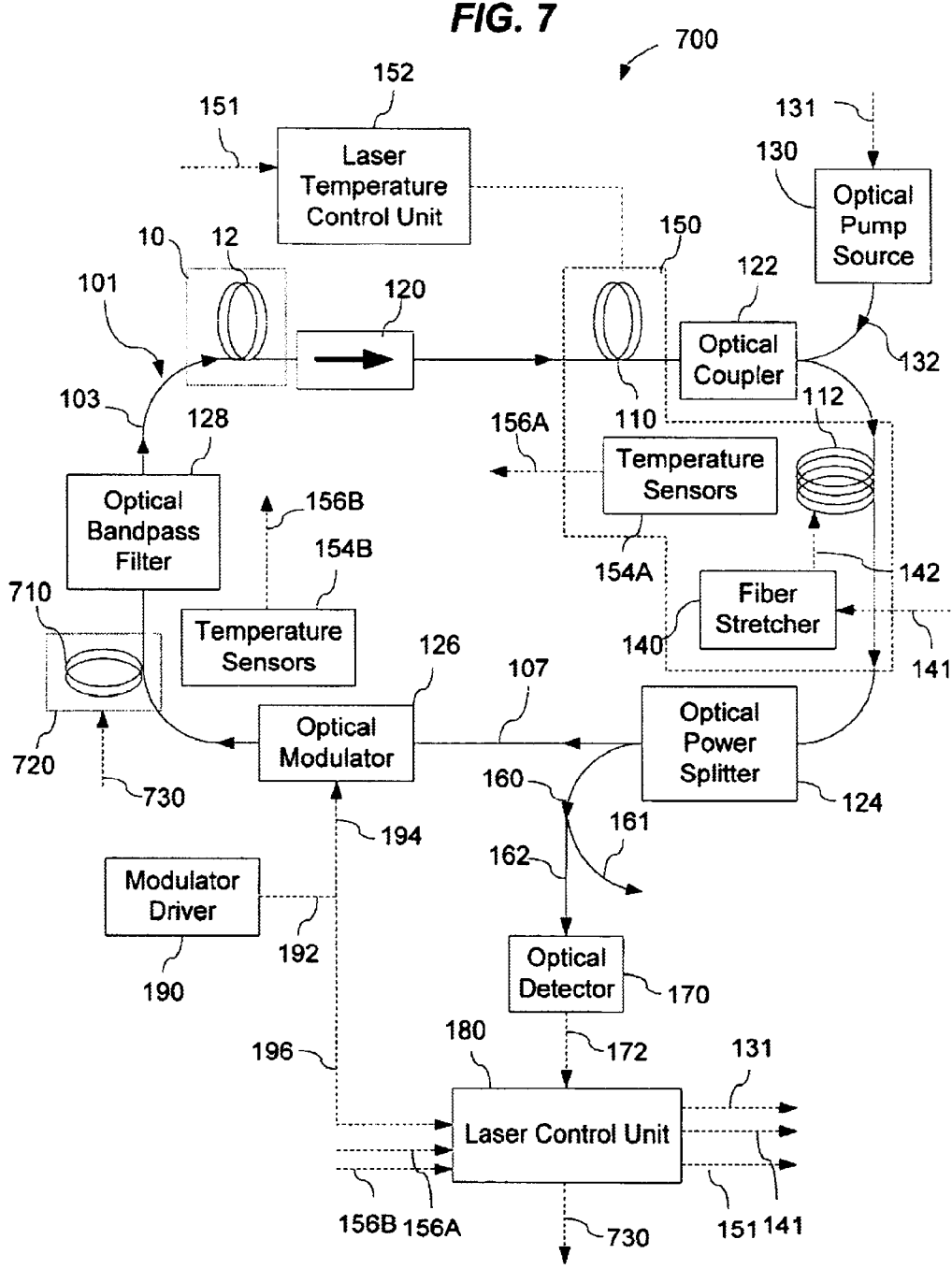
FIG. 7 shows an actively mode-locked fiber ring laser that includes a fast temperature control mechanism according to one embodiment, where solid arrowed lines represent optical paths and dashed arrowed lines represent the non-optical signal paths.

FIG. 7 shows that the laser 200 in FIG. 2 may be modified to add a fast temperature control device 720 over a fiber segment 710 shorter than the fiber segments 110 and 112 and located outside the chamber 150. In one implementation, the fiber segment 710 may be coated with a metallic layer on the exterior surface of the fiber. An electric current source is connected to the fiber exterior to supply a current that heats up the fiber segment 710 according to a control signal 730. In another implementation, a TEC may be used to control the temperature of the fiber segment 710. The thermal response time of this part is faster than the thermal response in the chamber 150 because the fiber segment 710 is shorter and hence has a low heat capacity. In this design, the laser 700 has three active control mechanisms with different ranges of response times. The PZT fiber stretcher 140 operates in the kilohertz range to correct high frequency disturbances such as vibrations. The fast thermal control 720 operates in the sub-hertz range to correct intermediate frequency disturbances. The thermal chamber 150 and the passive thermal compensator 10 provide a control over long-term drifts such as variations in the temperature of the surrounding environment.

In the laser 700, the PZT fiber stretcher 140 may be removed if the control device 720 is sufficient to correct the variations that are too fast for the thermal chamber 150. Hence, there is no need for the high-voltage power supply for the PZT stretcher 140. This further reduces the power of the control mechanisms.

Figure 8:
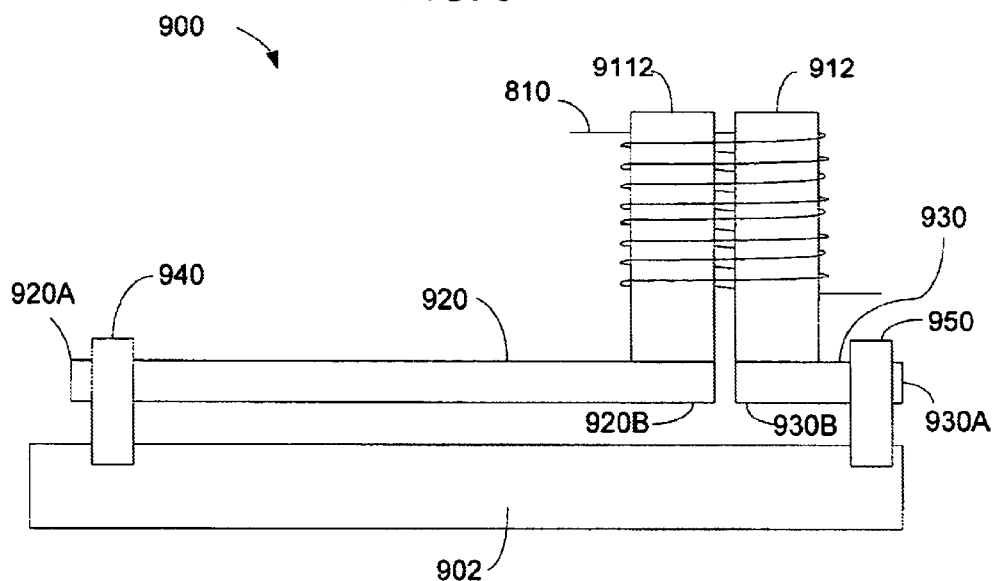
FIG. 8 shows another passive thermal compensator.

Other passive thermal compensators may also be used for mitigate thermal effects in fiber loops. FIG. 8 shows one example of a different passive thermal compensator 900. The passive compensator 900 includes two separate fiber holding parts 911 and 912 around which the fiber segment 810 is wound. A base 902 with a low coefficient of thermal expansion is provided. The alloy SuperInvar™, for example, may be used to form the base 902. Two separate beams 920 and 930 of different lengths, formed of a material with a coefficient of thermal expansion higher than that of the base 902, are engaged to two different locations 940 and 950 of the base 902 at their ends 920A and 930A, respectively. The opposite ends 920B and 930B of the beams 920 and 930 are engaged to the fiber holding parts 911 and 912, respectively. In the configuration as shown, when the temperature rises, the beams ends 920B and 930B expands and move toward each other. This motion reduces the stress on the fiber segment 810 and hence reduces the physical length of the fiber segment 810. When temperature decreases, the fiber holding parts 911 and 912 moves away from each other and hence increases the stress and the fiber length. Therefore, this device 900 provides a passive compensation mechanism and reduces the amount of the compensation to be performed by the PZT fiber stretcher 140.

In application, the above passive thermal compensator 900 may be used as an alternative to the bi-metal passive compensator 10 shown in FIGS. 1A and 1B. In addition, the passive thermal compensators 900 and 10 may be both used in a fiber laser or fiber device to passively mitigate the thermal effects in two different fiber segments.

Figure 9:
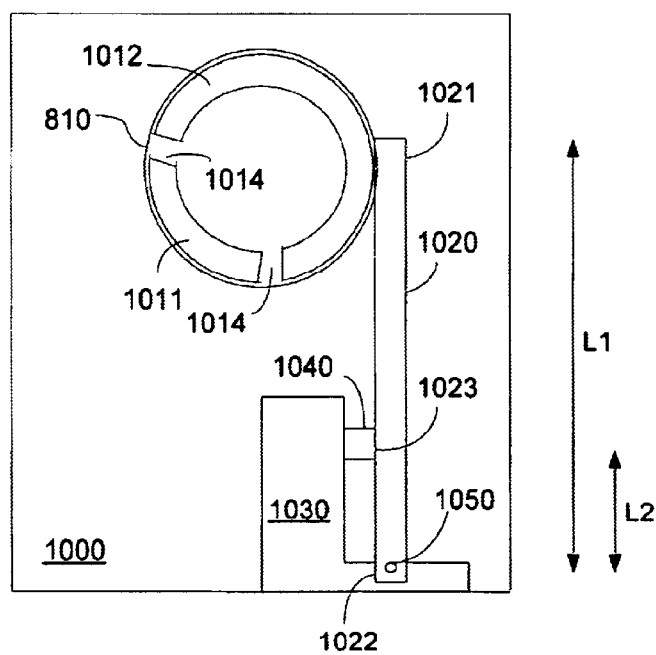
FIG. 9 shows one technique for amplifying a displacement of a PZT element in a fiber stretcher based on a mechanical amplification arm.

The operating range of the PZT fiber stretcher 140 may be limited by the maximum displacement of the PZT element. One way to overcome this is to use a mechanical amplification arm to amplify the displacement of the PZT element. FIG. 9 illustrates one embodiment of this mechanical amplification technique. The fiber stretcher 140 may includes two parts 1011 and 1012 formed from a cylindrical tube that are separated by gaps 1014. The part 1011 is fixed to a platform 1000 and the part 1012 is movable relative to the part 1011. A member 1030 is fixed to the platform 1000 and holds one end of a PZT element 1040. A mechanical arm 1020 has one end 1021 engaged to the part 1012 of the fiber stretcher 140 and another end 1022 engaged to a pivotal point 1050 on the member 1030. The PZT element 1021 is in contact with a selected location 1023 between the two ends of the arm 1020. Hence, a displacement of the PZT 1040 produces a displacement of the end 1021 of the arm 1020 by a factor of L1/L2.

Figure 10:
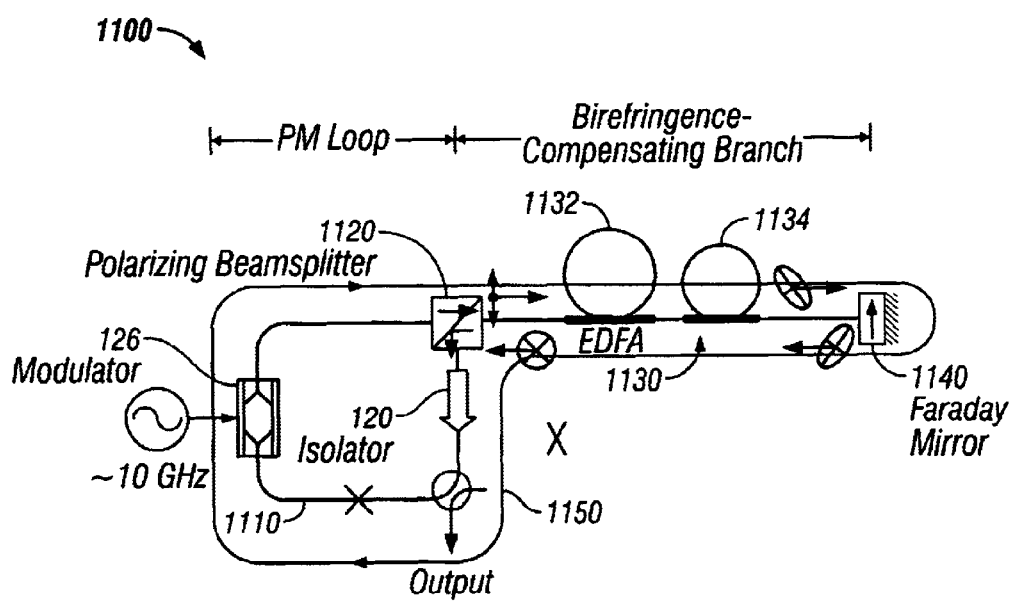
FIG. 10 shows a polarization-stable mode-locked fiber laser in which the present control mechanisms may be incorporated to stabilize the laser resonator.

In addition to ring fiber lasers in the above examples, the above control mechanisms may also be used in a polarization-stable fiber mode-locked laser 1100 shown in FIG. 10. See, U.S. Pat. No. 5,574,739. The laser cavity includes a first fiber part 1110 formed of a single-mode PM fiber and a second fiber part 1130 formed of a single-mode fiber. The first fiber part 1110 includes the modulator 126, the optical isolator 120, and the output coupler 124. Two terminals of the fiber part 1110 are coupled to two facets of a polarizing beam splitter 1120 which is coupled to one end of the second fiber part 1130. The other end of the fiber 1130 is terminated at a Faraday rotator mirror which reflects light with a 90-degree rotation in polarization. A portion 1132 of the second fiber part 1130 may be doped as the optical gain medium. The line 1150 represents the direction of the light in the optical cavity: light starts from the gain section 1132 to be reflected by the reflector 1140 and is amplified again before reaching the beam splitter 1120. Light in one polarization is selected to be reflected into the first fiber part 1110 by the beam splitter 1120 and is fed back to the gain section 1132 after being modulated by the modulator 126 and passing through the beam splitter 1120. Light in the other polarization is suppressed. The second fiber part 1130 may also include a dispersion compensating fiber segment 1134 similar to the segment 112 in FIG. 1. As in FIG. 1, the thermal control chamber 150 may be used to enclose only the second fiber part 1130 to reduce the power consumption. The fiber stretcher 140 may be placed in either of the fiber parts 1110 and 1130. Other control mechanisms, including the fast temperature control 720 in FIG. 7 and the passive thermal control in FIGS. 1A, 1B and 9 may also be used in the laser 1100.

An active mode-locked laser based on the above control mechanisms may produce laser pulses whose pulse repetition rate is in synchronization with a master clock. If the period of the master clock changes, the pulse repetition rate needs to change accordingly. This may also be achieved by using the active control mechanism, e.g., the fiber stretcher 140 in laser 100 in FIG. 1, to adjust the total optical path length of the laser cavity. Hence, the active control can be used for both stabilizing the laser against disturbances to produce a substantially constant pulse repetition rate and synchronizing the laser to the master clock.

Only a few embodiments are disclosed. However, it is understood that variations and enhancements may be made without departing from the spirit of and are intended to be encompassed by the following claims.

What is claimed is:

1. A device, comprising:
   a fiber loop to guide optical energy;
   a passive thermal compensator comprising (1) an inner hollow cylindrical member formed of a first material with a first coefficient of thermal expansion and having a gap along a cylindrical axis to split said inner hollow cylindrical member, and (2) an outer hollow cylindrical member formed of a second material with a second coefficient of thermal expansion greater than said first coefficient of thermal expansion and having a gap along a cylindrical axis to split said outer hollow cylindrical member, wherein said inner hollow cylindrical member is situated within said outer hollow cylindrical member and has an outer surface conformingly engaged to an inner surface of said outer hollow cylindrical member, wherein said passive thermal compensator is engaged to a portion of said fiber loop by winding said portion around said outer hollow cylindrical member to increase a length of said portion with a decrease in temperature and to reduce said length with an increase in temperature.

2. The device as in claim 1, wherein said fiber loop forms a ring which circulates said optical energy.

3. The device as in claim 2, wherein said ring comprises a doped fiber segment responsive to optical pumping by light at a pump wavelength to produce an optical gain at a laser wavelength different from said pump wavelength.

4. The device as in claim 3, said ring further comprises:

an optical modulator coupled in said ring to modulate a property of light in said ring at a modulation frequency;

an optical filter in said ring to pass light at said laser wavelength while rejecting light at other wavelengths; and an output optical coupler in said ring to extract a portion of light at said laser wavelength in said ring as an optical output.

5. The device as in claim 2, wherein said ring further comprises a dispersion compensation fiber segment which produces optical dispersion that negates optical dispersion in other segments of said ring.

6. The device as in claim 1, further comprising:

a thermal control chamber enclosing another portion of said fiber loop; and a thermal control unit in thermal contact with said thermal control chamber and operable to maintain said chamber at a constant chamber temperature.

7. A device, comprising:

a first fiber part formed of a single-mode fiber that maintains a polarization of light;

a polarizing beam splitter having a first optical facet coupled to a first terminal of said first fiber part, a second optical facet coupled to a second terminal of said first fiber part, and third optical facet opposing said first optical facet, said polarizing beam splitter configured to reflect light of a first polarization received from said third optical facet to said first optical facet and into said first terminal and to transmit light of said first polarization received from said second optical facet from said first fiber part to reach said third optical facet;

a second fiber part formed of a single-mode fiber and having a first terminal coupled to said third optical facet to exchange light with said first fiber part and a second terminal;

a Faraday rotator mirror coupled to said second terminal of said second fiber part to reflect light from said first terminal back with a rotation of 90 degrees in polarization; and a passive thermal compensator engaged in one fiber portion of said first and said second fiber parts and comprising (1) an inner hollow cylindrical member formed of a first material with a first coefficient of thermal expansion and having a gap along a cylindrical axis to split said inner hollow cylindrical member, and (2) an outer hollow cylindrical member formed of a second material with a second coefficient of thermal expansion greater than said first coefficient of thermal expansion and having a gap along a cylindrical axis to split said outer hollow cylindrical member, wherein said inner hollow cylindrical member is situated within said outer hollow cylindrical member and has an outer surface conformingly engaged to an inner surface of said outer hollow cylindrical member, wherein said passive thermal compensator is engaged to said one fiber portion by winding said one fiber portion around said outer hollow cylindrical member to increase a length of said one fiber portion with a decrease in temperature and to reduce said length with an increase in temperature.

8. The device as in claim 7, wherein said first fiber part includes an optical isolator transmits light propagating from said first terminal towards said second terminal and attenuates light propagating from said second terminal towards said first terminal in said first fiber part.

9. The device as in claim 7, wherein said first fiber part includes an optical modulator to modulate light at a modulation frequency.

10. The device as in claim 7, wherein said, second fiber part includes a doped fiber segment responsive to optical pumping by light at a pump wavelength to produce an optical gain at a laser wavelength different from said pump wavelength.

11. The device as in claim 10, further comprising an optical coupler to selectively couple a portion of light at said laser wavelength as a laser output.

12. The device as in claim 11, further comprising:

an optical detector coupled to receive a portion of said laser output to produce a detector output; and a fiber tuning element coupled to a selected location in said first or said second fiber part to adjust a fiber length in response to information in said detector output.

13. The device as in claim 7, wherein said second fiber part includes a dispersion compensation fiber segment which produces optical dispersion that negates optical dispersion in said first fiber part and other segments of said second fiber part.

14. The device as in claim 7, further comprising:

a thermal control chamber enclosing another fiber portion of said first and said second fiber parts that is different from said one fiber portion; and a thermal control unit in thermal contact with said thermal control chamber and operable to maintain said chamber at a constant chamber temperature.

15. A fiber ring laser, comprising:

a fiber ring includes a fiber gain portion to produce an optical gain for laser oscillation;

a passive control element coupled to a first fiber portion in said fiber ring to adjust said first fiber portion to negate an effect of thermal expansion without receiving power from a power supply; and an active control element coupled to a second portion of said fiber ring to adjust said second fiber portion according to information in an output optical signal from said fiber ring, said active control element energized by a power supply, wherein said passive control element comprises (1) an inner hollow cylindrical member formed of a first material with a first coefficient of thermal expansion and having a gap along a cylindrical axis to split said inner hollow cylindrical member, and (2) an outer hollow cylindrical member formed of a second material with a second coefficient of thermal expansion greater than said first coefficient of thermal expansion and having a gap along a cylindrical axis to split said outer hollow cylindrical member, wherein said inner hollow cylindrical member is situated within said outer hollow cylindrical member and has an outer surface conformingly engaged to an inner surface of said outer hollow cylindrical member, wherein said passive control element is engaged to said first fiber portion by winding said first fiber portion around said outer hollow cylindrical member.

16. A fiber laser, comprising:

an optical cavity formed of a fiber ring which includes a doped fiber segment responsive to optical pumping by light at a pump wavelength to produce an optical gain at a laser wavelength different from said pump wavelength;

an optical modulator in said fiber ring to modulate a property of light in said optical cavity at a modulation frequency;

an optical filter in said fiber ring to pass light at said laser wavelength while rejecting light at other wavelengths;

an output optical coupler in said fiber ring to extract a portion of light at said laser wavelength in said fiber ring as an optical output;

a fiber control element engaged in said fiber ring and operable to change a physical length of said fiber ring to stabilize said optical cavity according to information in said optical output; and a passive control element coupled to a first fiber portion in said fiber ring to adjust said first fiber portion to negate an effect of thermal expansion without receiving power from a power supply, said passive control element comprising (1) an inner hollow cylindrical member formed of a first material with a first coefficient of thermal expansion and having a gap along a cylindrical axis to split said inner hollow cylindrical member, and (2) an outer hollow cylindrical member formed of a second material with a second coefficient of thermal expansion greater than said first coefficient of thermal expansion and having a gap along a cylindrical axis to split said outer hollow cylindrical member, wherein said inner hollow cylindrical member is situated within said outer hollow cylindrical member and has an outer surface conformingly engaged to an inner surface of said outer hollow cylindrical member, wherein said passive control element is engaged to said first fiber portion by winding said first fiber portion around said outer hollow cylindrical member.

* * * * *